United States Patent [19]

Mostovsky

[11] Patent Number: 5,491,926
[45] Date of Patent: Feb. 20, 1996

[54] FISHING LURE

[76] Inventor: Leonid Mostovsky, 7145 Peri La., Brooklyn, N.Y. 11234

[21] Appl. No.: 254,595

[22] Filed: Jun. 6, 1994

[51] Int. Cl.⁶ .................................................. A01K 85/00
[52] U.S. Cl. .................. 43/42.19; 43/42.13; 43/42.11
[58] Field of Search .................... 43/42.19, 42.24, 43/42.13, 42.21, 42.26, 42.11

[56] References Cited

U.S. PATENT DOCUMENTS

| 1,678,448 | 7/1928 | Shannon | 43/42.19 |
|---|---|---|---|
| 1,787,726 | 1/1931 | Heddon | 43/42.13 |
| 1,856,043 | 4/1932 | Pflueger | 43/42.19 |
| 2,266,234 | 12/1941 | Mitchell | 43/42.13 |
| 2,272,710 | 2/1942 | Hoover | 43/42.19 |
| 4,510,710 | 4/1985 | Hanna | 43/42.13 |
| 4,750,290 | 6/1988 | Renaud | 43/42.24 |
| 4,884,358 | 12/1989 | Grove | 43/42.13 |
| 5,024,019 | 6/1991 | Rust | 43/42.11 |
| 5,136,801 | 8/1992 | Pond | 43/42.24 |
| 5,138,789 | 8/1992 | Hood | 43/42.19 |
| 5,412,899 | 5/1995 | Reboul | 43/42.13 |

FOREIGN PATENT DOCUMENTS 0640798  5/1962  Canada .............................. 43/42.13

Primary Examiner—P. Austin Bradley
Assistant Examiner—James Miner
Attorney, Agent, or Firm—Ilya Zborovsky

[57] ABSTRACT

A fishing lure comprises a main body having a predetermined weight, a hook connected to the main body, a shaft extending from the main body, a blade turnably connected to the shaft so as to turn relative to the shaft during fishing, and a second body connected with the shaft.

7 Claims, 2 Drawing Sheets center of gravity center of gravity new center of gravity new center of gravity

FISHING LURE

BACKGROUND OF THE INVENTION

The present invention relates to a fishing spinner lure, in particular for catching game fish.

Fishing spinner lures are known in the art in great varieties. Standard fishing spinner lures have a body or a weight located behind a blade. It can be in the form of metal beads or elongated piece of metal molded into the shaft. FIGS. 1 and 2 show fishing spinner lures, in particular a MAPPS-type fishing spinner lure and a Rooster Tail fishing spinner lure correspondingly. The weight body of such fishing spinner lures has a concentric shape and as a result possesses many disadvantages. One of the disadvantages of the standard fishing spinner lure is the line twist. The shaft tends to rotate in the direction the blade rotates, which causes the line to tangle. Another disadvantage is that the hook can easily be snagged on obstruction or weeds. It is therefore believed to be clear that it is advisable to further improve the existing fishing spinner lures.

SUMMARY OF THE INVENTION

Accordingly, it is an object of the present invention to provide a fishing spinner lure of the above mentioned general type, which avoids the disadvantages of the prior art.

In keeping with these objects and with others which will become apparent hereinafter, one feature of the present invention resides, briefly stated in a fishing spinner lure which has a body, a blade connected with the body, and a second body provided in addition to the first body.

When the fishing spinner lure is designed in accordance with the present invention, it avoids the disadvantages of the prior art. When in the fishing spinner lure the second body is provided, twisting of the line is prevented, the probability of catching a hook on an outside object is reduced, and also the second body operates as imitation of a small fish or worm to increase attractiveness of the fishing lure to fish. The pattern of movement of the fishing lure in water is changed. The fishing lure is more snag resistant and more weed resistant, so that it can be used for fishing in greater depths close to a bottom.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
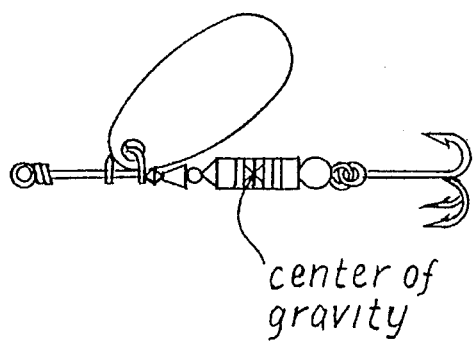
FIGS. 1 and 2 are views showing two fishing spinner lures in accordance with the prior art.
Figure 2:
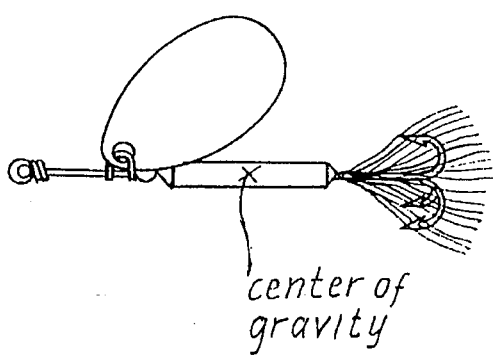
Figure 3:
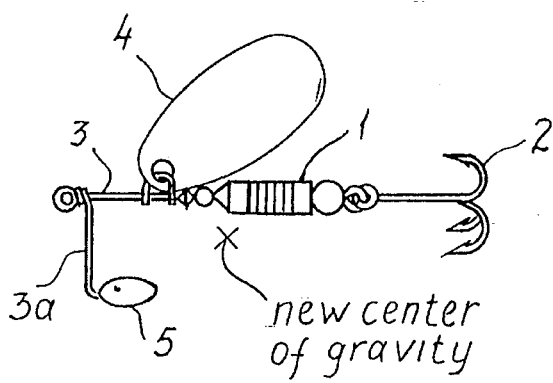
FIG. 3 and 4 are views showing fishing spinner lures in accordance with embodiments of the present invention.
Figure 4:
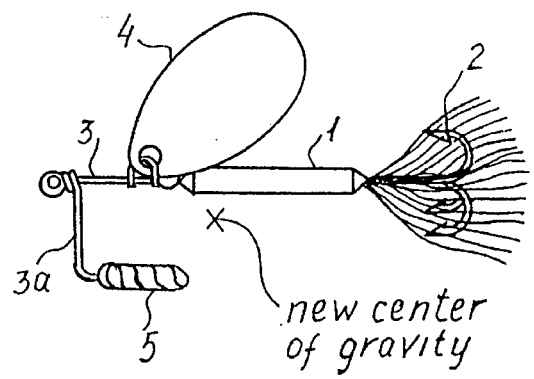
Figure 5:
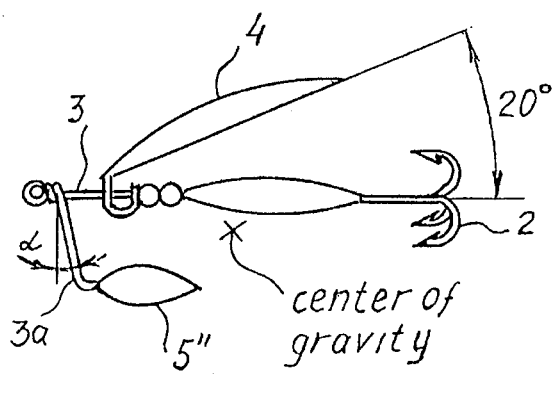
FIG. 5 is a view showing a fishing spinner lure in accordance with a further embodiment of the present invention.

As can be seen from FIG. 3, a fishing spinner lure in accordance with the present invention has a main body identified with reference numeral 1, a hook 2 attached to one end of the main body 1, and a two-wire shaft 3, 30 extending from the other end of the main body and including an upper arm 3 and a lower arm 3a. A blade 4 is connected with the shaft so as to be movable relative to the latter as known in the art. In accordance with the present invention the fishing lure is provided with an additional second body identified with reference numeral 5. The second body in the embodiment of FIG. 3 has a shape of a small fish. In the embodiment of FIG. 5, the second body 5' has the shape of an elongated metal piece molded into the shaft 3, 30. The second body can be formed both of metal and plastic. The second body 5' in FIG. 4 has a front metal part and a rear part formed as a worm tail. As can be seen from FIGS. 3 and 4, the center of gravity of the inventive fishing lures shown in FIGS. 3 and 4 is offset relative to the center of gravity of the prior art fishing lures shown in FIGS. 1 and 2.

Figure 6:
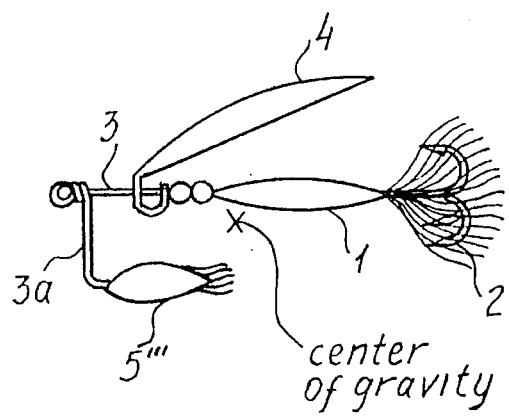
FIG. 6 is a view showing a fishing lure in accordance with an additional embodiment of the present invention.

The fishing lure shown in FIG. 5 also has the main body 1, the hook 2, the shaft 3, 30 and the blade 4 rotatable around the shaft. The main body 1 has an elongated shape and is composed of metal, such as lead or tin. The second body 5" has an elongated shape and mounted on the second or bottom wire arm 3a. As can be seen from the drawing the bottom wire arm 3a has a vertical part and a horizontal part, and the second body is mounted on the horizontal part of the wire arm 3a parallel to the main body 1. In the embodiment of FIG. 6, the second body 5" also has a skirt composed for example of plastic. It imitates a chased prey. In the embodiment of FIG. 5 the second body 5' is attached to the shaft by a wire portion extending at an angle to a perpendicular line to the shaft. In the embodiment of FIG. 6 the wire portion extends exactly perpendicular to the shaft.

Figure 7:
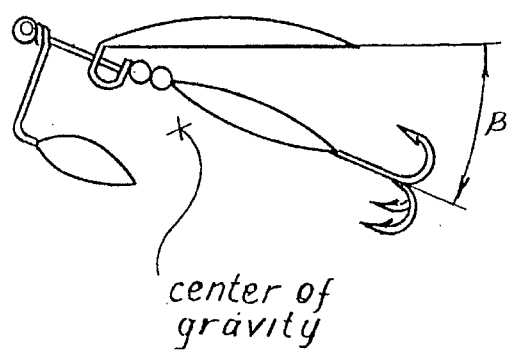
FIG. 7 is a view showing the inventive fishing lure which moves during its slowing down.

When the fishing lure in accordance with the present invention is provided with the second body, the pattern in which the fishing spinner lure moves through the water is changed. When retrieving with high speed, the fishing lure moves horizontally. When the retrieving slows down, the end of the fishing lure sinks and brings the lower body forward as shown in FIG. 7. The fishing lure turns clockwise at an angle β, and since the second body does not have a hook it protects the treble from snagging on rocks and logs. As a result, with the fishing lure in accordance with the present invention it is possible to fish in greater depth close to a bottom when fish sometimes is hidden in hideouts waiting for a prey. A further advantage of the second body is that it serves as a keel which prevents the line from twisting. This eliminates the main disadvantage of standard fishing spinner lures, which tend to rotate in the direction the blade spins.

It will be understood that each of the elements described above, or two or more together, may also find a useful application in other types of constructions differing from the types described above.

While the invention has been illustrated and described as embodied in a fishing lure, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fishing lure, comprising a shaft having two arms which, when the lure is afloat, are an upper arm and a lower arm; a main body mounted on the upper arm of said shaft and a second smaller body; a blade turnably connected to said upper arm of said shaft; a hook connected to said shaft behind said blade, said smaller body being immovably connected to said lower arm of said shaft and extending parallel to said main body so as to form a small copy of said main body without said blade and without said hook.

2. A fishing lure as defined in claim 1, wherein said smaller body has an elongated streamlined shape.

3. A fishing lure as defined in claim 1, wherein said lower arm has a part extending perpendicular to said upper arm and another part which is parallel to said upper arm, said smaller body being connected with said part which is parallel to said main body.

4. A fishing lure as defined in claim 1, wherein said second lower arm of said shaft has a part which extends at an angle to said upper arm and a part which extends parallel to said upper arm, said second smaller body being connected to said part which extends parallel to said upper arm.

5. A fishing lure as defined in claim 1, wherein said second body has a shape so as to imitate prey.

6. A fishing lure as defined in claim 5, wherein said second body imitates a worm.

7. A fishing lure as defined in claim 1, wherein said second body imitates a small fish.

* * * * *